July 29, 1947.  E. A. WENK ET AL  2,424,871
TOOL FOR FLARING TUBING
Filed April 18, 1944
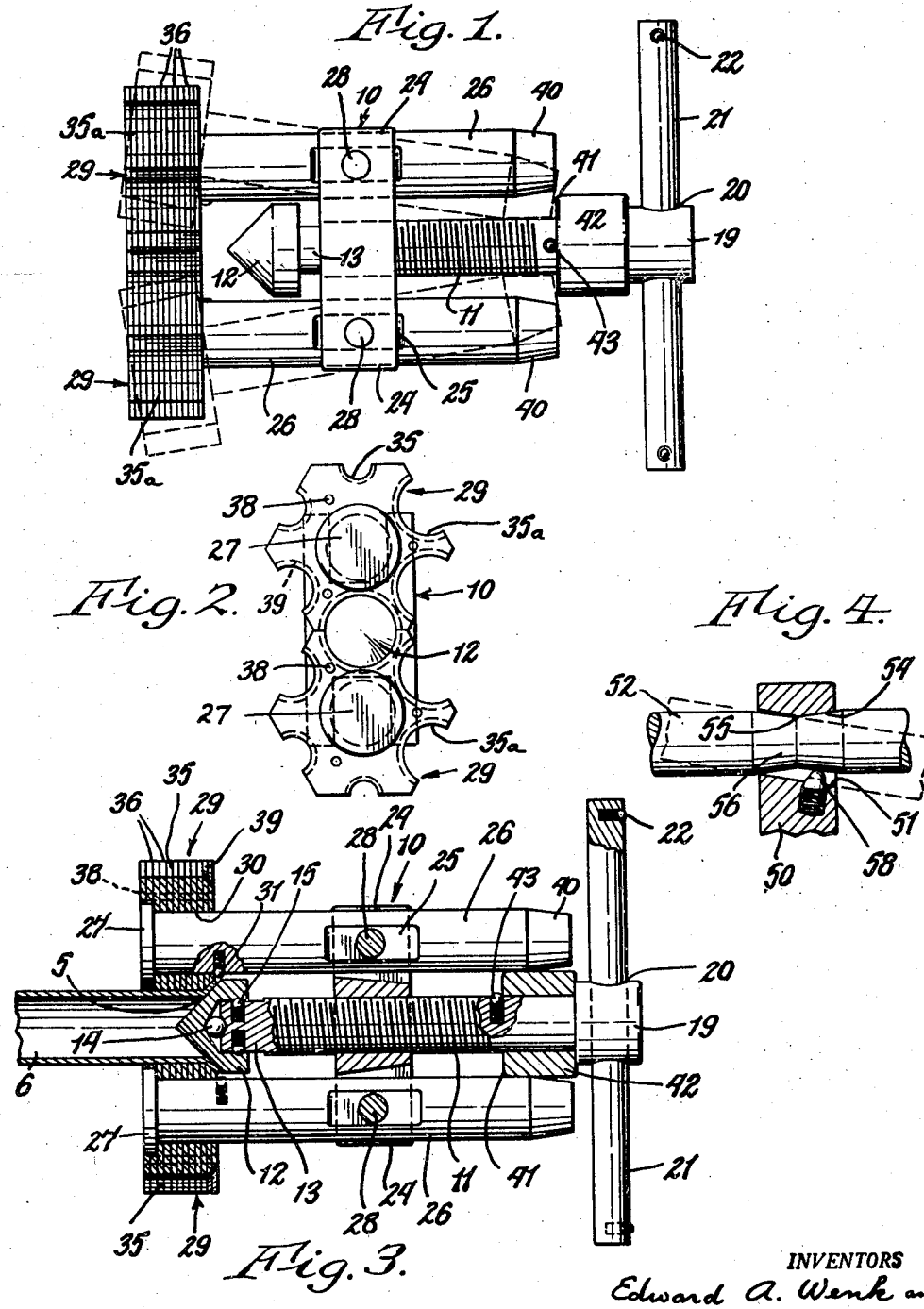
INVENTORS
Edward A. Wenk and
BY Ruth B. Wenk
Popp and Popp
ATTORNEYS Patented July 29, 1947

2,424,871

UNITED STATES PATENT OFFICE 2,424,871

TOOL FOR FLARING TUBING

Edward A. Wenk and Ruth B. Wenk, New York, N. Y., assignors to The Keystone Manufacturing Co., Buffalo, N. Y., a corporation of New York Application April 18, 1944, Serial No. 531,587

9 Claims. (Cl. 153—79)

1

This invention relates to a tool for flaring the end of tubing and more particularly to a portable hand tool for flaring the ends of relatively small, soft metal tubing manually to receive flare fittings.

One of the principal objects of the invention is to provide such a flaring tool which is compact and has a minimum of such projections which would interfere with the use of the tool in confined places, such as when the end of the tube to be flared projects only a short distance from a barrier or where it is closely confined by other structure.

Another object is to provide such a tool which requires but one operation to clamp it to the tube and to effect the flaring of the end of that tube.

Another purpose is to provide such a compact tool which has a wide range of sizes of tubing which it can flare.

Another aim is to provide such a flaring tool which can readily be adjusted to fit the particular size of tubing to be flared and will firmly grip and reliably flare the same with a minimum of effort on the part of the operator.

Another object is to provide such a tool which can be rapidly applied to the end to be flared and rapidly operated to flare the same.

Other objects are to provide such a tool which is rugged, simple and inexpensive in construction, reliable in operation, and which will stand up under conditions of severe and constant use without getting out of order or requiring repairs.

In the accompanying drawings:

Fig. 1 is a top plan view of a flaring tool embodying the present invention.

Fig. 2 is an end view of the same.

Fig. 3 is a horizontal sectional view through the same.

Fig. 4 is a fragmentary view similar to Fig. 3 and showing a modified form of the invention.

The tool forming the subject of the present invention is a portable hand tool for expanding a flare 5 at the end of a length of tubing for the purpose of connecting the tube with a flare fitting. The tube 6 is made of copper or other relatively soft metal and the tool as shown is designed for use with relatively small tubing, say, up to ¾ inch diameter.

In the form of the invention shown in Figs. 1-3, the tool comprises a cross bar 10 having a central threaded bore in which a screw shank 11 is screwed, this screw shank carrying at its front end a concentric conical head 12 in which it is free to rotate. For this purpose the front end of the screw shank is formed to provide a reduced cylindrical neck 13 and the head is formed to provide a bore which fits over this neck. A thrust ball 14 is interposed between the end of the screw shank and the end of the bore

2 in the head 12 and the head can be retained on the neck 13 by a plurality of radially moving spring loaded balls 15 which engage an annular groove provided in the bore of the head 12. It will be seen the screw shank is free to rotate relative to the conical head 12 and that the conical head 12 can be readily withdrawn from the neck 13, the spring loaded balls 15 serving, however, to prevent the head from being accidentally removed from the screw shank.

The opposite or rear end of the screw shank 11 has a head 19 which has a transverse bore 20 which slidingly receives a rod 21, this rod forming a handle for turning the screw shank. This rod can be prevented from sliding out of the bore 20 in any suitable manner as by the provision of spring loaded balls 22 projecting radially outward from the ends of the handle or rod 21.

Each end of the central cross bar is formed to provide a pair of horizontal jaws 24 which receive between them the opposite flattened central parts 25 of a cylindrical arm 26. These arms are pivoted to swing from a parallel position to the dotted line positions shown in Fig. 1 by vertical pins 28 which extend through the jaws 24 and arms 26 at each side of the tool. The front end of each of the cylindrical arms 26 is formed to provide a round head 27 which is recessed into the end of a corresponding die 29 rotatably mounted on the cylindrical arm. Each die 29 is made in the form of an equal sided polygonal wheel having a bore 30 fitting on the shank of its cylindrical arm and the adjacent head 27 of the cylindrical arm is held in the end recess in the die wheel by a spring loaded ball 31 which projects radially outward from the arm 26 into engagement with the rear side of the corresponding die wheel 29. It will be seen that these spring loaded balls 31 retain the die wheels 29 on the ends of the arms 26 while permitting the die wheels to turn freely thereon. It will further be seen by recessing the heads 27 of the arms 26 into the ends of the die wheels 29 that the tool can be brought into operative relation with the end of a tube 6 even though only the minimum amount of the tube projects from a wall or other obstruction.

Each side of each die wheel is provided with a half round axially extending groove 35, 35a, etc., these grooves being of different sizes to fit the different sizes of standard tubing which the tool is designed to flare. The two die wheels 29 are identical in construction and hence it will be seen that by turning the die wheels 29 the corresponding half round grooves can be brought into register with each other and the arms 26 then swung inwardly to grip the end of the tubing 6 in these grooves. In order to provide the necessary roughness in each groove 35, 35a, etc. to securely grip the tube 6, each die wheel 29 is preferably made of a series of laminations 36, these laminations being held together by a plurality of axially extending rivets 38. The rear end of each half round groove 35, 35a, etc., is bevelled, as indicated at 39 to conform to the conical head 12.

The positioned die wheels 29 are brought into firm gripping relation with the tube 6 by screwing in the threaded shank 11. For this purpose the rear end of each of the arms 26 is tapered, as indicated at 40, and these tapers are engaged by the outer leading edge 41 of a cam ring 42. This cam ring surrounds the unthreaded part of the screw shank 11 between its threads and its end head 19 and is preferably held in position against the head 19 by a spring loaded ball 43 projecting radially outward from the screw shank 11 into engagement with the front side of the cam ring 42. It will be seen that the cam ring 42 is free to turn and hence present fresh contacting cam areas to the arms 26 and it will also be seen when the die wheels 29 are firmly engaged with the tube 6 that the cam ring 42 rides along the straight parts of the arms 26 without further spreading action.

In use the operator backs off the screw shank 11 and opens up the arms 26 to the dotted line position shown in Fig. 1. He then turns the die wheels 29 until the size of half round grooves 35, 35a, etc., conforming to the size of the tube 6 he is flaring are brought into register with each other. He then fits the die wheels together and fits the end of the tube 6 in the bore provided by the selected half round grooves, leaving a sufficient end of the tube projecting rearwardly from the die wheels to provide the flare 5. The operator then screws the screw shank 11 in by means of the handle 21, holding the body of the tool in his other hand.

The inward movement of the screw shank 11 first brings the cam ring 42 into engagement with the tapers 40 of the arms 26, the leading edge 41 of the cam ring riding along these tapers so as to spread the rear ends of the arms 26 apart. Through the pivots 28 this causes the front ends of these arms to be brought together and the die wheels 29 to be brought into firm contact with the tube 6 and with each other. Following this the cam ring 42 rides up on the straight parts of the arms 26.

The inward movement of the screw shank 11 causes the tapered head 12 to enter and engage the end of the tube 6 projecting rearwardly from the die wheels 29. This tapered head causes the wall of the tube to be spread and then brought into engagement with the bevelled faces 39 surrounding the rear end of the opening through the die wheels. In consequence the taper 5 is formed. The laminated form of the die wheels 29 insures sufficient roughness or gripping edges in the half round grooves 35, 35a, etc., to insure a reliable grip on the tube 6.

After the tube has been flared, the operator backs off the screw shank, thus withdrawing the tapered head 12 from the taper and also moving the cam edge 41 of the cam ring toward the rear ends of the arms 26. When this cam edge 41 reaches the small diameter of the tapers 40, the arms 26 can be spread apart to the dotted line position shown in Fig. 1, thereby permitting the tool to be withdrawn from the flared end of the tube 6.

The modified form of the invention shown in Fig. 4 illustrates an alternative way of pivotally mounting the arms on the cross bar. As there shown, the cross bar 50, instead of being provided with the jaws 24 as in Figs. 1–3, is provided at each end with a through bore 51 which is of the same diameter as the corresponding cylindrical arm 52, these bores being arranged at an angle to the major axis of the tool and extending forwardly and outwardly so as to permit the arms 52 to take the dotted line position shown in Fig. 1. Each end of the cross bar 50 is provided with another bore 54 which is of the same diameter as the arms 52 and extends inwardly from the rear wall of the cross arm at the same angle as the bore 51 but in the opposite direction, that is, the bore 54 extends forwardly and inwardly. The axes of the bores 51 and 54 intersect at the center of the cross bar 50 and hence it will be seen that a Y-shaped aperture is provided having an inwardly extending knife edge bearing 55 at its center. Each arm 52 is formed to provide a V-shaped contraction 56 which engages, at its center, the knife edge bearing 55 and a spring loaded detent 58 is provided in the bore 51 of each arm 50 to engage the reduced portion 56 of the corresponding arm 52.

It will be seen that each cylindrical arm 52 can be slid endwise in the bore 51 and then straightened to the position shown in Fig. 4. In this position the contracted part of each arm 52 engages the knife edge bearing 55 which holds the arm against axial displacement while at the same time permitting it to pivot from the full to the dotted line positions shown. This condition thereby provides a very simple and easily assembled mounting for the arms of the tool.

From the foregoing it will be seen that the present invention provides a simple and compact flaring tool which is operated to clamp to the tube and to flare the same by a single operation, that is, by screwing in the screw shank 11. Further a wide range of tube diameters can be accommodated by the tool and the tube is firmly gripped while being flared.

We claim as our invention:

1. A tube flaring tool, comprising a pair of arms, means pivotally connecting said arms to swing about spaced parallel axes to permit the free ends thereof to move toward and from each other, a die carried at the free end of each of said arms and adapted to grip the tube to be flared and holding said tube on an axis extending lengthwise of and intermediate said arms and through the central part of said connecting means, a tapered head carried by said connecting means intermediate said axes and axially alined with the gripped end of said tube, and means for moving said tapered head relative to said connecting means and along said axis to flare the end of said tube.

2. A tube flaring tool, comprising a cross bar, a pair of arms, pivoted to the ends of said cross bar to swing about parallel axes, a die carried at the free end of each of said arms and adapted to grip the tube to be flared and holding said tube on an axis extending lengthwise of and intermediate said arms and through the central part of said cross bar, said cross bar being provided with a central threaded bore axially in line with said axis of the tube gripped by said dies, a screw in said threaded bore and means carried by the end of said screw for flaring the end of said gripped tube outwardly against said dies.

3. A tube flaring tool, comprising a pair of arms, means pivotally connecting said arms to permit the free ends thereof to move toward and from each other, a die carried at the free end of each of said arms and adapted to grip the tube to be flared and holding said tube on an axis extending lengthwise of and intermediate said arms and through the central part of said connecting means, means carried by said connecting means and movable along said axis into engagement with the end of the tube gripped by said dies to flare the end thereof outwardly against said dies, and means actuated by said movable means and moving said arms to effect a firm grip between said dies and tube.

4. A tube flaring tool, comprising a cross bar, a pair of arms centrally pivoted to the ends of said cross bar to swing about parallel axes, a die carried at the forward end of each of said arms and adapted to grip the tube to be flared and holding said tube on an axis extending lengthwise of and intermediate said arms and through the central part of said cross bar, the opposite ends of said arms being provided with opposing cam faces, said cross bar being provided with a central threaded bore axially in line with the axis of the tube gripped by said dies, a screw in said threaded bore, means carried by the forward end of said screw for flaring the end of said gripped tube outwardly against said dies, and a cam head secured to the rear end of said screw and having cam surfaces engageable with the cam faces of said arms to spread the rear ends of said arms when said screw is moved forwardly to effect a firm grip between said dies and tube.

5. A tube flaring tool, comprising a cross bar, a pair of arms centrally pivoted to the ends of said cross bar to swing about parallel axes, a die carried at the forward end of each of said arms and adapted to grip the tube to be flared and holding said tube on an axis extending lengthwise of and intermediate said arms and through the central part of said cross bar, the opposite ends of said arms being provided with opposing cam faces, said cross bar being provided with a central threaded bore axially in line with said axis of the tube gripped by said dies, a screw in said threaded bore, means carried by the forward end of said screw for flaring the end of said gripped tube outwardly against said dies, and a cam head movably secured to the rear end of said screw for free rotary movement thereon and having concentric annular cam surfaces engageable with the cam faces of said arms to spread the rear ends of said arms when said screw is moved forwardly and effect a firm grip between said dies and tube.

6. A tube flaring tool, comprising a pair of arms, means pivotally connecting said arms to swing about spaced parallel axes to permit the free ends thereof to move toward and from each other, a die wheel rotatably mounted at the free end of each of said arms, each of said die wheels being of polygonal form with axial half round grooves provided in its polygonal faces and said grooves being of different sizes to fit different diameters of tubes and holding each tube on an axis extending lengthwise of and intermediate said arms and through the central part of said connecting means, a screw threadedly mounted intermediate said axes on said connecting means for movement along said axis, and a head carried at the end of said screw and movable, upon turning said screw, into the end of said tube to flare the end of said tube outwardly.

7. A tube flaring tool, comprising a pair of arms, means pivotally connecting said arms to permit the free ends thereof to move toward and from each other, a die carried at the free end of each of said arms and adapted to grip the tube to be flared and holding said tube on an axis extending lengthwise of and intermediate said arms and through the central part of said connecting means, and means carried by said connecting means and movable along said axis for flaring the wall of said tube against said dies, each of said dies comprising a plurality of laminations in full planar contact with one another and extending at right angles to the axis of the tube and rivets permanently securing said laminations together.

8. A tube flaring tool, comprising a pair of arms, means pivotally connecting said arms to permit the free ends thereof to move toward and from each other, a die wheel rotatably mounted at the free end of each of said arms, each of said die wheels being of polygonal form with axial half round grooves provided in its polygonal faces and said grooves being of different sizes to fit different diameters of tubes and holding each tube on an axis extending lengthwise of and intermediate said arms and through the central part of said connecting means, and means carried by said connecting means and movable along said axis for flaring the wall of a tube held in the corresponding grooves of said die wheels, each of said die wheels comprising a plurality of laminations in full planar contact with one another and extending at right angles to the axis thereof and rivets permanently securing said laminations together.

9. A tube flaring tool, comprising a cross bar provided at each of its ends with a Y-shaped bore the enlarged end of which is at the rear side of the cross bar, means providing opposed knife edge bearings in the central parts of said bores, a pair of arms insertable through said bores, each of said arms having a reduced portion providing a V-shaped groove the apex of which is engageable with the corresponding knife edge bearing thereby to permit said arms to swing about parallel axes, a die carried at the free end of each of said arms and adapted to grip the tube to be flared, and means carried by said cross bar for flaring the wall of said tube against said dies.

EDWARD A. WENK.
RUTH B. WENK.

REFERENCES CITED

The following references are of record in the file of this patent:

UNITED STATES PATENTS

| Number | Name | Date |
|---|---|---|
| 1,795,358 | Arndt | Mar. 10, 1931 |
| 1,783,639 | Canny et al. | Dec. 2, 1930 |
| 1,976,878 | Eden | Oct. 16, 1934 |
| 641,258 | Becher | Jan. 16, 1900 |
| 1,270,958 | Lane | July 2, 1918 |
| 236,365 | Sherman | Jan. 4, 1881 |
| 626,427 | Jones | June 6, 1899 |
| 2,132,947 | Gagne | Oct. 11, 1938 |
| 851,491 | Broadbooks | Apr. 23, 1907 |
| 1,720,133 | Le Roy | July 9, 1929 |

FOREIGN PATENTS

| Number | Country | Date |
|---|---|---|
| 8,622 | Great Britain | Apr. 26, 1901 |